(12) United States Patent
Taketsuna et al.

(10) Patent No.: US 7,211,024 B2
(45) Date of Patent: May 1, 2007

(54) TOROIDAL TYPE CONTINUOUSLY VARIABLE TRANSMISSION

(75) Inventors: Yasuji Taketsuna, Okazaki (JP); Shigenori Tamaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/250,902

(22) PCT Filed: Jan. 11, 2002

(86) PCT No.: PCT/JP02/00124

§ 371 (c)(1),
(2), (4) Date: Jul. 10, 2003

(87) PCT Pub. No.: WO02/057655

PCT Pub. Date: Jul. 25, 2002

(65) Prior Publication Data

US 2004/0043860 A1 Mar. 4, 2004

(30) Foreign Application Priority Data

Jan. 19, 2001 (JP) .............................. 2001-012291

(51) Int. Cl.
*F16H 15/38* (2006.01)
(52) U.S. Cl. ................................ 476/40; 476/8; 476/46
(58) Field of Classification Search .................... 476/7, 476/8, 40, 42, 46
See application file for complete search history.

(56) References Cited

U.S. PATENT DOCUMENTS

| | | | | |
|---|---|---|---|---|
| 4,484,487 A | * | 11/1984 | Kraus | 476/8 |
| 4,629,444 A | * | 12/1986 | Miranti, Jr. | 474/93 |
| 5,564,993 A | * | 10/1996 | Robinson | 476/10 |
| 5,989,150 A | | 11/1999 | Yamamoto | |
| 6,616,568 B2 | * | 9/2003 | Ooyama | 476/40 |

FOREIGN PATENT DOCUMENTS

| | | |
|---|---|---|
| JP | A 61-93659 | 5/1986 |
| JP | A SHO 63-163095 | 7/1988 |
| JP | 6-341514 | * 12/1994 |
| JP | A HEI 09-003571 | 1/1997 |
| JP | A 10-61725 | 3/1998 |
| JP | A 10-132047 | 5/1998 |
| JP | A 11-132304 | 5/1999 |
| JP | A HEI 11-280876 | 10/1999 |
| JP | A 11-336868 | 12/1999 |
| JP | A 2000-507667 | 6/2000 |
| JP | A 2000-257793 | 9/2000 |
| JP | A 2001-221309 | 8/2001 |

* cited by examiner

*Primary Examiner*—William C Joyce
(74) *Attorney, Agent, or Firm*—Oliff & Berridge, PLC

(57) ABSTRACT

A toroidal continuously variable transmission in which a rolling member is arranged between a pair of rotary members with contacting its outer circumferential face with a rolling face of those rotary members being opposed to each other through an oil film, and in which a holding member for holding the rolling member in a rotatable condition is provided includes a lubricating oil feeding hole for spraying lubricating oil to a plurality of portions at the center side of the rotation of at least one of the end faces of the rolling member in an axial direction, which is arranged on the holding member.

11 Claims, 5 Drawing Sheets (A)

(B)

TOROIDAL TYPE CONTINUOUSLY VARIABLE TRANSMISSION

TECHNICAL FIELD

This invention relates to a toroidal type (or traction type) continuously variable transmission which is constructed to vary the gear ratio continuously by means of varying the torque transmitting point between the rolling member and the rotary member in the radial direction, with clamping a rolling member between a pair of rotary members to transmit a torque from one of the rotary member to the other rotary member through the rolling member by rotating one of the rotary member.

BACKGROUND ART

A continuously variable transmission of this kind is constructed with, e.g., clamping a disc-shaped roller between a pair of discs arranged opposed to each other. The portion of the pair of discs where the outer side from a predetermined radius has an arcuate plane congruent with the arc centered on the center point of opposed planes of those discs, and such arcuate plane is leading to circumferential direction. The plane thus incurved three-dimensionally is a toroidal plane. The toroidal plane functions as a rolling face and the roller is clamped therebetween. The roller is a disc-shaped member and its sectional figure along in-depth direction of the outer circumferential portion is congruent with the arcuate figure of the rolling face of the discs. Accordingly, the roller is rotated by means of rotating one of the discs, and the other disc rotates sequentially. Then, the roller is inclined to move the radial position of the contact portion against one of the discs, i.e., the radial position from the center axis of the disc outward, and also to move the radial position of the contact portion against the other disc to inner circumferential side, so that the speed change ratio corresponding to the proportion of the radii of each contact portions is thereby set.

The amount of the torque to be transmitted by the toroidal type continuously variable transmission of this kind is varied in accordance with the load to clamp the rollers by the discs. The bigger so-called clamping force of the discs for clamping the roller becomes, the more the transmittable torque increases pro rata. Also, in the toroidal type continuously variable transmission, transmission of the torque is executed with forming an oil film between the disc and the roller, and with utilizing a sharing force of the oil film. Therefore, the bigger the torque to be transmitted between the disc and the roller is, the bigger the shearing force of the oil film becomes. Accordingly, the amount of heat is increased at the torque transmitting portion.

Generally, a material of above mentioned discs and rollers is a metal, and a treatment to increase surface hardness is applied on those discs and rollers, however, mechanical characteristics of those such as hardness and abrasion resistance is deteriorated if a temperature is risen when it is under operation due to above mentioned heat generation. In this connection, there is provided a device, which is constructed to execute cooling with forming an oil film by means of spraying lubricating oil aggressively to the outer circumferential face of the roller, and feeding the lubricating oil by rotating the roller to the boundary face where the disc and roller are contacted, is disclosed in Japanese Patent Laid-Open 2000-507667 as a prior art. According to the prior art disclosed in the above-mentioned Laid-Open, the oil film may be formed between the roller and the disc with transporting the lubricating oil blown to the outer circumferential face of the roller to the contact portion with the disc, by means of rotating the roller. Accordingly, a plenty of lubricating oil contacts with the outer circumferential face of the roller, and cooling of the contact portion between the roller and the disc may be thereby executed. However, in general, temperature rise becomes problematic when the roller is rotating in high speed. Accordingly, most of the lubricating oil is easy to be scattered immediately due to centrifugal force even if the lubricating oil is blown to the outer circumferential face of the roller, as disclosed in the above-mentioned Laid-Open. Therefore, amount of the lubricating oil to be fed to the disc is not exactly sufficient and so that there is a disadvantage on the torque transmitting capacity to be limited because of insufficient cooling of the disc.

This invention has been made in the view of the aforementioned technical problem, and its object is to provide a toroidal type continuously variable transmission, which has an excellent cooling effect.

DISCLOSURE OF THE INVENTION

In order to achieve the aforementioned objective, the present invention is characterized by providing a structure for radiating a heat on a portion where is not directory involved in transmitting a torque at aforementioned rotary members such as discs or rollers. More specifically, according to the present invention, there is provided a toroidal type continuously variable transmission in which a rolling member is arranged in between a pair of rotary members with contacting its outer circumferential face with a rolling face of those rotary members being opposed to each other through an oil film, and in which a holding member for holding the rolling member in a rotatable condition is provided therewith, is characterized in that: a lubricating oil feeding hole for spraying lubricating oil to a plurality of portions at the center side of the rotation of at least one of the end faces of said rolling member in an axial direction is provided on said holding member.

According to the present invention, therefore, the rolling member contacting with the rolling face of the rotary members through the oil face is rotated by means of rotating one of the rotary members, which is clamping the rolling member. Then, the torque is transmitted from the rolling member to the other rotary member through the oil film, so that the torque is transmitted from one of the rotary member to the other rotary member after all. In this case, radii of the contact positions of the rolling member against each rotary member are differed when the rolling member is inclined against the center axis of the rotation of the rotary members, and the speed change ratio corresponding to the proportion of the radii is thereby set. And the lubricating oil is blown to the plurality of portions at the center side of the rotation of at least one of the end faces of the rolling member in the axial direction from the feeding hole of the holding member. The lubricating oil flows with spreading all over the end face by means of the rotation of the rolling member, and cools the rolling member with drawing a heat from the rolling member in the meantime.

Also, according to the present invention, there is provided a continuously variable transmission; in which a rolling member is arranged between a pair of rotary members with contacting its outer circumferential face with a rolling face of those rotary members being opposed to each other through an oil film; in which a holding member for holding the rolling member in a rotatable condition is provided therewith; and in which the lubricating oil is fed to the rolling member held by the holding member in the rotatable condition, is characterized in that: the holding member comprises a circular plate for covering the most part of at least one of the end face of the rolling member in the axial direction, with being opposed to said end face.

With this construction, therefore, the speed change ratio is set as the predetermined value, by means of transmitting the torque from one of the rotary member to the other rotary member through the rolling member, and inclining the rolling member against the center axis of rotation of the rotary member. The lubricating oil is fed to the rolling member, whereas at least one of the end faces of the rolling member in the axial direction is covered by the circular plate portion of the holding member. Accordingly, the lubricating oil is kept in saturating condition between the rolling member and the rotary member. Consequently, the rolling member is cooled by the lubricating oil conserved on the end face side of the rolling member with drawing the heat.

Moreover, according to the present invention, a seal member for forming an oil reservoir between the circular plate portion and the end face of the rolling member in the axial direction may be arranged on the outer circumferential portion of the circular plate portion.

With this construction, accordingly, the oil reservoir is formed on the side of at least one of the end faces of the rolling member in the axial direction, and the rolling member is cooled by the lubricating oil saturated therein.

Furthermore, according to the present invention, there is provided a toroidal type continuously variable transmission in which a rolling member is arranged between a pair of rotary members with contacting its outer circumferential face to a rolling face of those rotary members being opposed to each other through an oil film; and in which a holding member for holding the rolling member in a rotatable condition is provided therewith, is characterized in that: a concavo-convex portion is formed on at least one of the end faces of the rolling member.

The concavo-convex portion may function as a fin for radiating the heat.

With this construction, therefore, the speed change ratio is set as the predetermined value by means of transmitting the torque from one of the rotary member to the other rotary member through the rolling member, and inclining the rolling member against the center axis of rotation of the rotary member. Heat radiation from one of the end faces of the rolling member to the air or to the lubricating oil is expedited by means of the concavo-convex portion or the fins. As a result, the rolling member is thereby cooled aggressively.

Also, above-mentioned concavo-convex portion may be micro projections for making a flow of the lubricating oil turbulent.

With this construction, accordingly, the flow of the lubricating oil generated as a result of the rotation of the rolling member is made turbulent flow by means of the micro projections. Consequently, heat conductivity from the rolling member to the lubricating oil becomes bigger and the rolling member is therefore cooled aggressively by the lubricating oil.

Still moreover, black body finishing to expedite heat radiation may be applied to the surface of the rotary member or the rolling member.

With this construction, therefore, heat dissipation from the surface of the rotary member or the rolling member is generated aggressively, and as a result, cooling of the rotary member or the rolling member is expedited, and the temperature rise of those is thereby prevented or suppressed.

On the other hand, according to the present invention, there is provided a continuously variable transmission; in which a rolling member is arranged between a pair of rotary members with contacting its outer circumferential face with a rolling face of those rotary members shaped into a full toroidal type curved face being opposed to each other through an oil film; and in which a holding member for holding the rolling member in a rotatable condition is provided therewith, is characterized in that: fins for radiating the heat are formed on any portion of the rolling member other than the rolling face.

With this construction, therefore, the speed change ratio is set as the predetermined value by means of transmitting the torque from one of the rotary member to the other rotary member through the rolling member, and inclining the rolling member against the center axis of rotation of the rotary member. The rotary member contacts with the lubricating oil or the ambient air with generating a flowage relatively, by means of its rotation. In this case, the heat transfer from the rolling member to the ambient air or the lubricating oil is expedited by the fins, and as a result, the rotary member is thereby cooled aggressively.

Still moreover, according to the present invention, there is provided a toroidal type continuously variable transmission; in which a rolling member is arranged between a pair of rotary members with contacting its outer circumferential face to a rolling face of those rotary members being opposed to each other through an oil film; and in which a holding member for holding the rolling member in a rotatable condition is provided therewith, is characterized in that: an oil passage for feeding the lubricating oil to the opposite side of the rolling face of the rotary member is provided; and micro projections for making the flow of the lubricating oil turbulent are formed on the face to which the lubricating oil is to be fed.

With this construction, therefore, the speed change ratio is set as the predetermined value by means of transmitting the torque from one of the rotary member to the other rotary member through the rolling member, and inclining the rolling member against the center axis of rotation of the rotary member. The lubricating oil is fed to the opposite side i.e., back side of the rolling face of the rotary member, and flown to the outer circumferential side of the rotary member by means of centrifugal force generated from the rotation. In this case, the flow of the lubricating oil becomes turbulent by the micro projections formed on the back face of the rotary member. As a result, the heat conductivity between the rotary member and the lubricating oil becomes bigger, and the rotary member is thereby cooled aggressively by the lubricating oil.

BEST MODE FOR CARRYING OUT THE INVENTION

Figure 1:
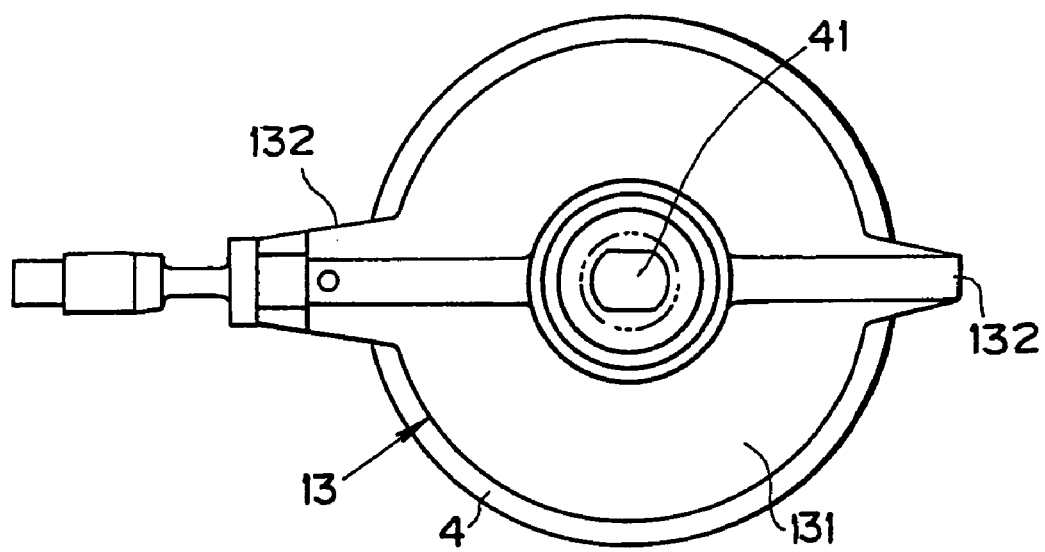
FIG. 1 is a drawing showing one example of a power roller in a continuously variable transmission according to this invention, and (A) is a plane view, (B) is a sectional view.
Figure 1:
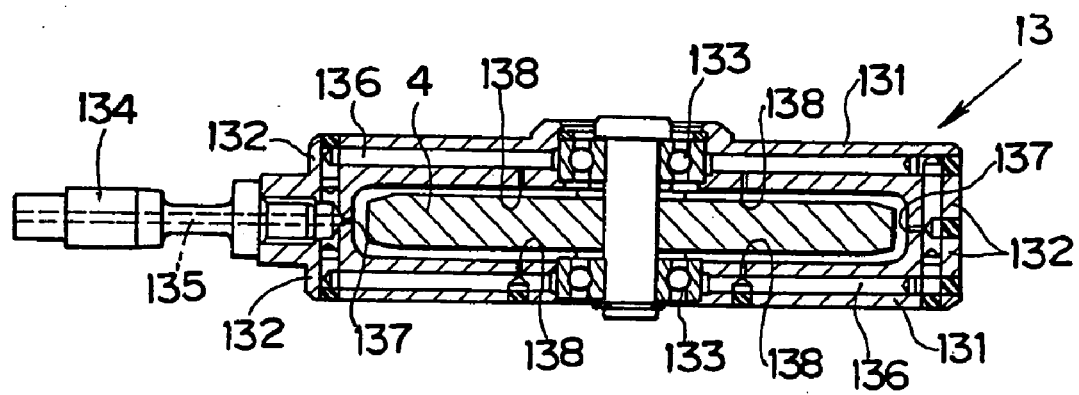

Next, this invention will be described in connection with a specific embodiment shown in the drawings. First of all, to describe one example of a toroidal type continuously variable transmission subjected to this invention, a double cavity type full toroidal type continuously variable transmission 1 is depicted typically in FIG. 9. In the toroidal type continuously variable transmission 1, a pair of input discs 2 are arranged in so-called back-to-back relation each other, and a pair of output discs 3 are arranged to be opposed to those input discs 2, namely, with sandwiching those input discs 2.

Figure 9:
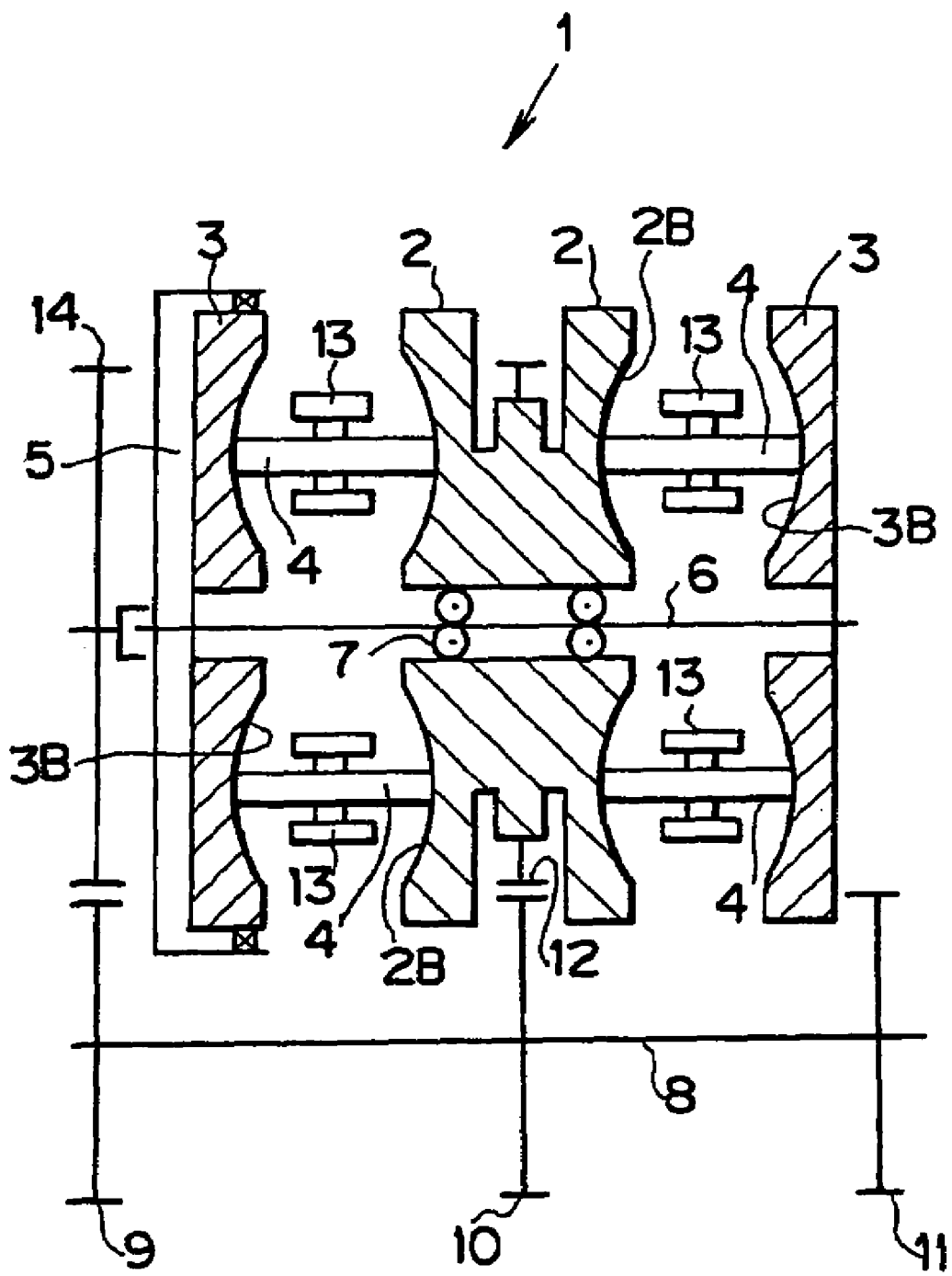
FIG. 9 is a typical side sectional view showing one example of entire construction of a continuously variable transmission according to this invention.

Those discs 2 and 3 are made such that portions of their opposed faces on an outer circumference side from a predetermined radius are shaped, as cut in a plane on the center axis, to have a section of an arcuate plane of a predetermined radius, likewise the discs of the toroidal type continuously variable transmission according to the prior art. And a power roller (a rolling member) 4, which corresponds to an idling member or a transmission member is sandwiched between rolling faces 2B and 3B which are formed into such arcuate plane. That is, the output disc 3 in the right hand side of FIG. 9 is fixed in the axial direction, and a hydraulic chamber 5 is arranged in the backside (opposite side of the rolling face 2B and 3B) of the output disc 3 in the left hand side. And the power roller 4 is clamped by each of the input discs 2 and the output discs 3 by means of feeding the oil pressure according to the torque to be transmitted to the hydraulic chamber 5. Namely, it is constructed to generate the clamping force for clamping the power roller 4 by each discs 2 and 3 from the oil pressure to be fed to the hydraulic chamber 5.

Here, each output discs 3 is connected to rotate integrally by an output shaft 6 arranged along the center axis of those discs, and the output shaft 6 penetrates center portions of each input discs 2.

Also, a bearing 7 is arranged between each input discs 2 and output shaft 6, and those input discs 2 and the output shaft 6 are constructed to rotate relatively.

Also, an input shaft 8 is arranged rotatably in parallel with the output shaft 6. The input shaft 8 is slightly longer than the entire length of the continuously variable transmission 1, and gears 9, 10 and 11 are installed on three places in total such as its both front and rear end portions, and its intermediate portion. The gear 10 at the intermediate portion is engaged with a gear 12 integrated with said each input discs 2. Accordingly, the torque is inputted to the continuously variable transmission 1 from the input shaft 8 through those gears 10 and 12.

Moreover, said power roller 4 is a disc-shaped member, and the outer circumference of which has a sectional shape formed into a curved face with the curvature equal to the arc of the rolling face 2B and 3B of each discs 2 and 3. The power roller 4 is inclined with respect to the individual discs 2 and 3; therefore, radial portions of the contact portions between the power roller 4 and the discs 2 and 3 are arbitrarily changed. Three power rollers 4 are arranged between each input discs 2 and output discs 3 at even intervals, and six power rollers are provided all together for the continuously variable transmission 1 as a whole.

Furthermore, each power roller 4 is held rotatably and inclinably by a carriage 13 which functions as a holding member. This carriage 13 has a lubricating oil passage formed for feeding the lubricating oil to the outer circumferential face of the power roller 4, as mentioned below.

Besides, an input gear 14 engaged with the gear 9 installed on the input shaft 8 is provided, and the input gear 14 is rotated by the motive energy of a power source such as an engine (not shown).

One example of the power roller 4 and the carriage 13 is depicted in (A) and (B) of FIG. 1. The carriage 13 shown therein comprises a pair of circular plates 131 which has a diameter slightly smaller than the power roller 4. Two portions of each circular plate 131 opposing each other in the diametrical parallel are protruded outside of the outer diameter of the power roller 4, and formed into butt portions 132 with leading to the side of the face being opposed to each other. The circular plates 131 are assembled integrally with butting the butt portions 132, and as a result, a spaces which is little bit thicker than the power roller 4, is formed between those circular plates 131 to accommodate the power roller 4 therein. More specifically, the power roller 4 comprises a shaft portion 41 on its center portion, and the shaft portion 41 is held in a rotatable condition by a bearing 133, which is mounted on the center portion of each circular plate 131. Consequently, the power roller 4 is held by the carriage 13 in a rotatable condition.

A stem 134 as a shaft shaped member is mounted on one of the butt portions 132. This stem 134 is connected with a linear acting type actuator such as a hydraulic cylinder (not shown) in an oscillatable condition. The power roller 4, which is clamped by each of discs 2 and 3 is moved by the actuator backward and forward, and the power roller 4 is inclined against the center axis of rotation of each discs 2 and 3 in consequence.

Also, an oil passage 135 is formed along the center axis of the stem 134. An end portion of the oil passage 135 of the actuator side is communicated with not shown hydraulic feeding unit. And another oil passage 136 to be communicated with the oil passage 135 is formed in each circular plate 131. Namely, the oil passage 136 penetrating the circular plate 131 is formed from one of the butt portion 132 to the other butt portion 132, and the oil passage 136 at each circular plate 131 is opened to the butt face.

Accordingly, as shown in FIG. 1, the oil passage 136 at upper and lower circular plates 131 are communicated each other at the butt portion 132. And the oil passage 135 at the stem 134 is communicated with the oil passage 136 of the circular plate 131 side in consequence of connecting the stem 134 with one of the butt portions 132. Besides, the oil passage 136 at each circular plate 131 is formed as a loop in order to compass the outer circumference of each bearing 133. That is, it is constructed to feed the lubricating oil to the bearing 133.

A lubricating oil spraying nozzle 137 to be communicated with the oil passage 136 is formed on each butt portion 132 with opening to the outer circumferential face of the power roller 4. Also, a plurality of lubricating oil feeding holes 138 for feeding the lubricating oil to the end face of the power roller 4 in the axial direction, i.e., to an upper face and a lower face in FIG. 1 is formed in the vicinity of the center portion of each circular plate 131 with being communicated with the oil passage 136 at each circular plate 131. Besides, the lubricating oil feeding hole 138 may be formed into a plurality of pinhole shaped holes, otherwise, may be formed into narrow slit shape in order to let the lubricating oil spurt in film shape. Accordingly, the lubricating oil is fed to the bearing 133 simultaneously with being spurted to the outer circumferential face and both upper and lower face of the power roller 4, by means of feeding the lubricating oil to the oil passage 136 at each circular plate 131 through the oil passage 135 of the stem 134.

In the aforementioned continuously variable transmission 1, a torque is transmitted to the input disc 2 by means of rotating the input gear 14 by not shown power source such as an engine or the like, through the gear 9 engaged with the input gear 14 and the input shaft 8. The power roller 4 contacting with the rolling face 2B through the oil film is rotated when the input disc 2 rotates, and the output disc 3 is rotated subsequently, because the power roller 4 contacts with the rolling face 3B of the output disc 3 through the oil film. As a result, the output shaft 6 integrated with the output disc 3 is therefore rotated.

In this case, the number of revolutions of the power roller 4 is determined depending on the number of revolutions of the input disc 2 and the radius from the center of rotation at the contact portion with its rolling face 2B. Also, the number of revolutions of the output disc 3 is determined depending on the number of revolutions of the power roller 4 and the radius from the center of rotation at the contact portion of the power roller 4 with the rolling face 3B. Accordingly, the number of relative rotations of the output disc 3 to the input disc 2 is determined in connection with the radial position of the contact portions of the power roller 4 against each rolling faces 2B and 3B, and speed change ratio is changed continuously by means of varying the contact portions of the power roller 4 against each rolling faces 2B and 3B by inclining the power roller 4 to the center axis of the output shaft 6.

The lubricating oil is being fed to the carriage 13 through the oil passage 135 of the stem 134, when the continuously variable transmission 1 is thus under operation. Accordingly, the lubricating oil is fed to the oil passage 136 of each circular plate 131 with being pressurized, and the lubricating oil is spurt from the lubricating oil spraying nozzle 137 to the outer circumferential face of the power roller 4 in consequence. The lubricating oil thus adhered on the circumferential face of the power roller 4 is transported to the contact portions against each discs 2 and 3 by means of rotation of the power roller 4, and forms an oil film mainly therebetween. And the transmission of the torque is executed among the power roller 4 and each discs 2 and 3 with utilizing a shearing force of the oil film. Also, a part of the lubricating oil spurt in the power roller 4 is scattered by a centrifugal force, 6 however, the lubricating oil draws a heat form the power roller 4 and the power roller 4 is thereby cooled.

Also, the lubricating oil fed to the oil passage 136 is spurt from the lubricating oil spraying hole 138 to the portion near the center of rotation of the power roller 4. The lubricating oil is flown to the outer circumferential side of upper and lower face of the power roller 4 by the centrifugal force generated from the rotation, and spread to all over those faces. Especially, in the aforementioned continuously variable transmission 1, both upper and lower face of the power roller 4 is covered with the circular plate 131 and it is not the absolute open space, therefore, the lubricating oil spurt from the lubricating oil feeding hole 138 is aggressively daubed onto both upper and lower face of the power roller 4. Consequently, the contacting area between the power roller 4 and the lubricating oil becomes larger, and the heat transfer from the power roller 4 to the lubricating oil is thereby expedited. Accordingly, the power roller 4 is cooled aggressively.

Namely, the power roller 4 is cooled efficiently because the lubricating oil spurt from the lubricating oil feeding hole 138 spreads to both upper and lower faces of the power roller 4 and draws the heat from the power roller 4, and because the lubricating oil is thrown off from the outer circumference of the power roller 4 by the centrifugal force. Moreover, the lubricating oil is partially drizzled over the rolling faces 2B and 3B of each discs 2 and 3, therefore, each discs 2 and 3 is cooled by the lubricating oil with its heat being drawn.

Aforementioned continuously variable transmission 1 is constructed to feed the lubricating oil to the end face of the power roller 4 in the axial direction, i.e., the upper face or the lower face in FIG. 1, from a plurality of portions. Therefore, it is possible to feed the film shaped lubricating oil to the upper face or the lower face of the power roller 4 entirely with diffusing, as a result, heat conductivity between the power roller 4 and the lubricating oil is thereby improved and the power roller 4 is cooled efficiently. Moreover, the upper face or the lower face of the power roller 4 is covered with the circular plate 131 of the carriage 13; therefore, it is possible to keep the lubricating oil staying in the upper face side or the lower face side of the power roller 4. Consequently, the heat conductivity between the power roller 4 and the lubricating oil is improved and the power roller 4 is thereby cooled efficiently.

Figure 2:
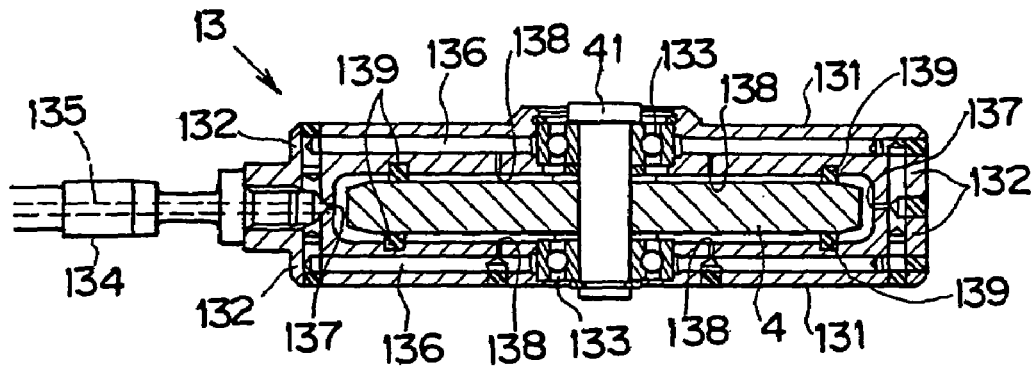
FIG. 2 is a sectional view showing another example of the power roller in a continuously variable transmission according to this invention.

As described above, if the lubricating oil is kept in between the power roller 4 and the circular plate 131, contact between the power roller 4 and the circular plate 131 is facilitated the power roller 4 may be cooled efficiently. Accordingly, it may also be constructed to form an oil reservoir between the power roller 4 and the carriage 13 in order to conserve the lubricating oil. An example is shown in FIG. 2.

The example shown therein is the example of providing a seal member 139 for sealing the space between the circular plate 131 and the power roller 4 liquid tightly, on the outer circumferential side of the circular plate 131 opposing to the power roller 4. That is, the seal member 139 is installed on the carriage 13, and contacts with the upper face or the lower face of the power roller 4 with scraping. Accordingly, the lubricating oil spurt from aforementioned lubricating oil feeding hole 138 flows on the upper face or the lower face of the power roller 4 and spreads to the outer circumferential side, however, the oil reservoir is generated on the portion of inner circumferential side from the seal member 139, because the flow is arrested by the seal member 139. As a result, most part of the power roller 4 is covered with the lubricating oil and its heat is drawn by the lubricating oil, therefore, the power roller 4 may be cooled efficiently.

Besides, if the lubricating oil completely remains in the oil reservoir of inner circumferential side from the seal member 139, a temperature becomes higher gradually and no more cooling action is generated. Therefore, in order to avoid such disadvantage, it is preferable to generate the flowage of the lubricating oil on both upper and lower sides of the power roller 4 with leaking the lubricating oil sequentially by means of forming a notch portion on a portion of the seal member 139, or by means of forming a through hole on the circular plate 131.

Figure 3:
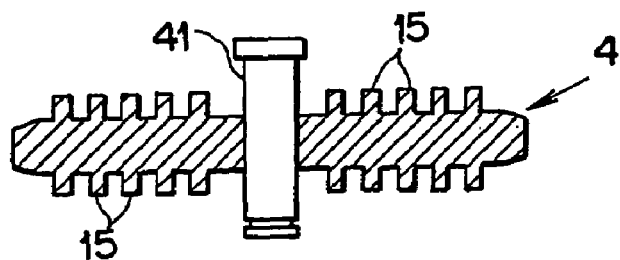
FIG. 3 is a side sectional view showing an example of the power roller with fins formed thereon which is usable for a continuously variable transmission according to this invention.

Cooling of the power roller 4 is executed with radiating the heat to the lubricating oil or the ambient air as mentioned above, therefore, it is preferable to form concavo-convex portions on the surface of the power roller 4 in order to enhance the cooling action. One example of forming a fin 15 for enlarging the heat radiating area is shown in FIG. 3, as an example of the concavo-convex portions. A plurality of thin fins 15 is formed on both upper and lower faces of the power roller 4 shown in FIG. 3. The fins 15 may be formed into a ring shape, a spiral shape, or an appropriate shape arranged at certain intervals such as an arcuate shape.

Aforementioned fins 15 may be held by the carriage 13 which has the circular plate 131, as shown in FIG. 1 or FIG. 2, because their function is to enlarge the heat radiating area against the ambient lubricating oil and air. Otherwise, the power roller 4 shown in FIG. 3 may also be held by a carriage according to the prior art which is constructed of a pair of rectangular plate shaped member, in lieu of the carriage 13. Namely, the amount of the heat radiation by the fins 15 is enhanced and the power roller 4 may be cooled efficiently, even if in the case of cooling the power roller 4 with spraying the lubricating oil only to its outer circumferential face and exposing its both upper and lower face to the ambient air.

Figure 4:
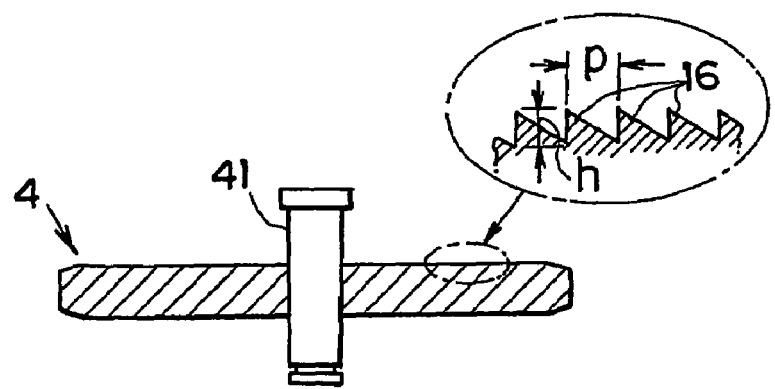
FIG. 4 is a side sectional view showing an example of the power roller with micro projections which is usable for a continuously variable transmission according to this invention.

Another example of the concavo-convex portions is shown in FIG. 4. The example shown therein is an example of cooling the power roller 4 with the lubricating oil, and there are formed micro projections 16 for making a flowage of the lubricating oil turbulent on both upper and lower face of the power roller 4. The micro projections 16 are sawtooth shaped projections as closed up in FIG. 4, such as, a face toward the center of the power roller 4 is vertical, and the face leading to the outer circumferential side from the vertical face is an inclined face to form a sectional triangle. Also, the ratio between a pitch p and a height h (p/h) is set from 7 to 10. Besides, the micro projections 16 may be arranged as a circularity formation in the circumferential direction, or may be arranged at certain intervals in the circumferential direction and formed in alternate shifts in the radial direction.

Also, the micro projections 16 may be formed into regularly arranged projections by means of a mechanical processing such as cutting or pressing. Otherwise, the micro projections 16 may be formed into irregularly arranged projections by means of making surface of the power roller 4 rough. In this case, the ratio between the pitch and the height of the micro projections 16 is preferably around 10 to 13 in average.

It is preferable for the power roller 4 in which aforementioned micro projections 16 are formed thereon to be used with being installed on the carriage 13 having the circular plate 131 as shown in FIGS. 1. or 2., and the lubricating oil is fed to the portion at the center side of the rotation of both upper and lower faces when the torque is transmitted. And the lubricating oil is flown to the outer circumferential side by the centrifugal force generated from rotation of the power roller 4; however, the flowage of the lubricating oil is made turbulent by means of the micro projections 16. As a result, heat conductivity between the surface of the power roller 4 and the lubricating oil becomes bigger, and the amount of the heat to be transmitted from the power roller 4 to the lubricating oil becomes larger. Therefore, the power roller 4 is cooled efficiently.

In the toroidal type continuously variable transmission 1, as mentioned above, a heat is generated in consequence of transmission of a torque among the discs 2, 3 and the power roller 4, a temperature of the discs 2 and 3 which is involved in the transmission of the torque becomes accordingly higher. If a facial pressure and a temperature of the rolling faces 2B and 3B of the discs 2 and 3 become higher, durability and abrasion resistance is deteriorated. Therefore, it is desirable to cool the discs 2 and 3 aggressively.

Figure 5:
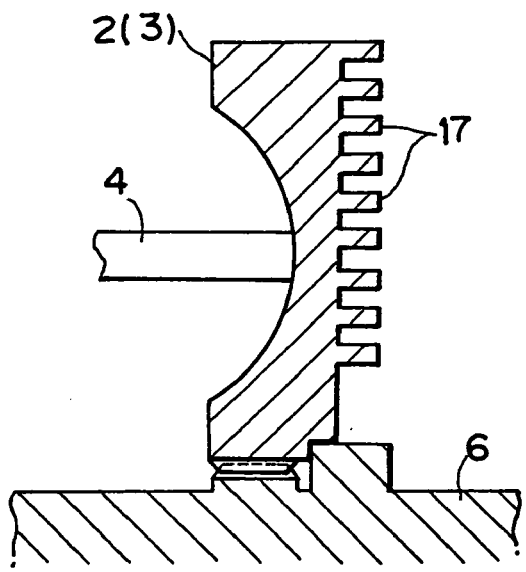
FIG. 5 is a side sectional view showing an example of a disc with fins which is usable for a continuously variable transmission according to this invention.

Both of cooling i.e., with the air or with the lubricating oil may be employed in case of cooling the discs 2 and 3, likewise the cooling of the power roller 4 as mentioned above. As shown in FIG. 5, a structure wherein a number of thin plated fins 17 are formed on the back face i.e., opposite side of the rolling faces 2B and 3B may be employed as a structure for executing air-cooling. Besides, it is allowable for the fins 17 to be formed into appropriate shapes such as ring shaped fins leading to the circumferential direction, or into arcuate shaped fines arranged intermittently in the circumferential direction.

Accordingly, the ambient air is flown relatively to the discs 2 and 3 when the discs 2 and 3 in which the fins 17 are formed thereon are rotated, and the status becomes compulsory cooling with blowing air to the fins 17. Consequently, discs 2 and 3 are cooled aggressively by the air from its backside face in connection with the enlargement of the heat radiating area resulted from providing of the fins 17. Therefore, a temperature rise is prevented or suppressed.

Figure 6:
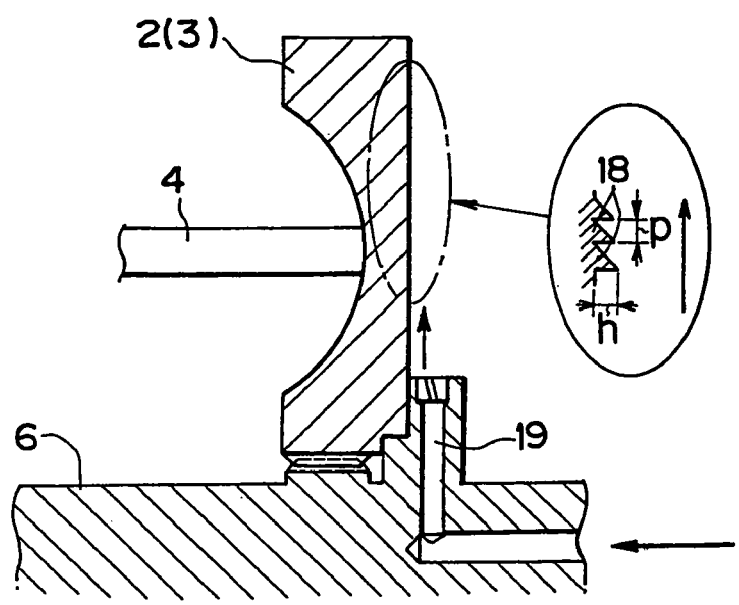
FIG. 6 is a side view showing an example of a disc with micro projections which is usable for a continuously variable transmission according to this invention.

On the other hand, a construction for cooling with the lubricating oil is shown in FIG. 6. In the example shown therein, micro projections 18 are formed on the backside of the discs 2 and 3. The micro projections 18 have a same kind of shape as that of the aforementioned micro projections 16 of the power roller 4 depicted in FIG. 4. A cross section in which a face toward the center of the rotation of discs 2 and 3 is vertical and shaped into sawtooth shape, and the ratio between pitch p and height h (p/h) is set from 7 to 10. The micro projections 18 may be formed into regularly arranged projections by means of mechanical processing, otherwise, may be formed into irregularly arranged projections by means of chemical treatment for making surface roughness rough. Moreover, an oil passage 19 for spurting the lubricating oil to backside of the discs 2 and 3 is formed in an output shaft 6 which supports the discs 2 and 3.

According to the construction shown in FIG. 5, the lubricating oil is spurted to the backside of the discs 2 and 3 from the oil passage 19 when the discs 2 and 3 is rotated, and then, the lubricating oil is flown to the outer circumferential side by the centrifugal force in connection with the rotation of the discs 2 and 3. The flowage of the lubricating oil is made turbulent on the surface where the lubricating oil is to be flown, because there are formed the micro projections 18 and surface is like a so-called rough face. Consequently, heat conductivity among the discs 2, 3 and the lubricating oil becomes bigger, and the heat generated as a result of transmission of the torque is conducted to the lubricating oil aggressively. Accordingly, the discs 2 and 3 are thereby cooled.

Figure 7:
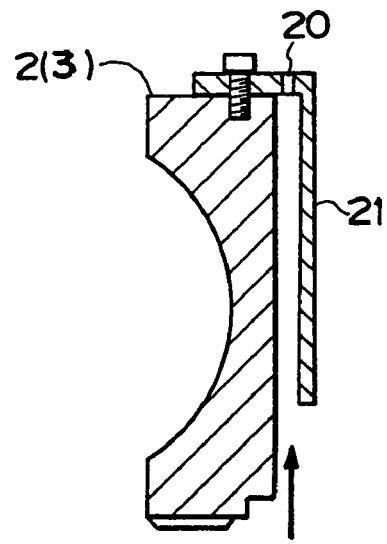
FIG. 7 is a side sectional view showing an example of a disc in which a cover is mounted on its backside.
Figure 8:
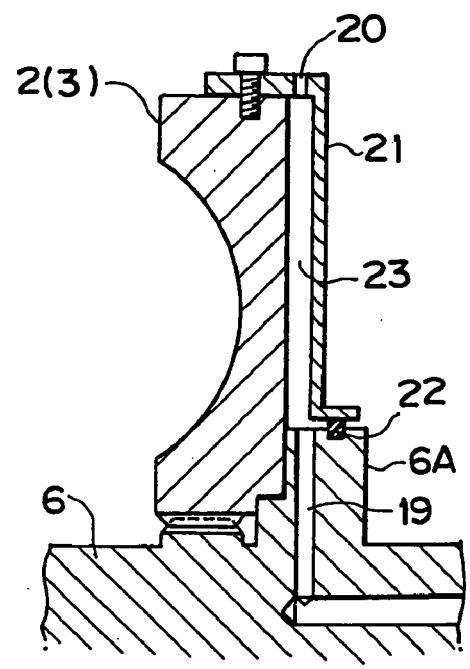
FIG. 8 is a side sectional view showing an example of an hydraulic chamber formed with mounting a cover on the backside of the disc.

Besides, the amount of heat transfer between the lubricating oil and the discs 2, 3 becomes bigger if contacting time of those is long in some level. In this connection, for example, it is preferable to make the contacting time of the lubricating oil and the discs 2, 3 longer in some measure, by means of installing a cover 21 which have a through hole 20 on its outer circumferential portion with covering the backside of the discs 2, 3, so as to conserve the lubricating oil spurted from the oil passage 19 inside of the cover 21, as depicted in FIG. 7. Also, as sown in FIG. 8, a hydraulic chamber 23 may be formed inside of the cover 21, by means of contacting an end portion of inner circumferential side of the cover 21 with an outer circumferential face of a flange portion 6A which is formed on the output shaft 6.

By the way, heat dissipation is generated in connection with heat radiation (heat emission) other than heat transfer. Therefore, black body finishing is applied to at least any one of the surface of aforementioned discs 2, 3, power roller 4, or carriage 13, in order to increase its emissivity. An appropriate method such as a heat treatment or a coating treatment with a ceramic or a resin is sufficient for the black body finishing. With this construction, the amount of heat dissipation in connection with heat radiation becomes larger in proportion as a temperature rise of the discs 2, 3 or the power roller 4, therefore, the temperature rise of the discs 2, 3 and the power roller 4 may be prevented or suppressed.

Here, this invention should not be limited to the specific embodiments thus far described, but it may also be applied to a single cavity type full toroidal type continuously variable transmission, or to a half toroidal type continuously variable transmission. Moreover, in short, it is sufficient for the fins for executing air cooling to be formed on the portion other than the rolling face, and it is also possible for the fins to be formed on the face of outer circumferential side.

Here will be synthetically described the advantages to be attained by this invention. According to the present invention, as has been described hereinbefore, the lubricating oil is spurted to a plurality of portions at the center side of the rotation of at least one of the end face of the rolling member in the axial direction, from the feeding hole of the holding member. The lubricating oil is flown with spreading all over the end face by means of the centrifugal force, and the lubricating oil cools the rolling member with drawing a heat from the rolling member in the meantime. Accordingly, a temperature rise of the rolling members and the rotary members are prevented or suppressed, and as a result, a torque transmitting capacity of the continuously variable transmission may be increased, and its durability may also be improved.

Also, according to the present invention, at least one of the end faces of the rolling member in the axial direction is covered with the circular plate of the holding member and the lubricating oil is kept saturated therebetween. Therefore, the rolling member is cooled by the lubricating oil conserved on the end face side of the rolling member with being drawn the heat. Accordingly, the temperature rise of the rolling member and the rotary member are prevented or suppressed. As a result, a torque transmitting capacity of the continuously variable transmission may be increased, and its durability may also be improved.

Moreover, according to the present invention, the oil reservoir is formed with the seal member on at least one of the end faces of the rolling member in the axial direction and the rolling member is cooled by the lubricating oil saturated therein. Accordingly, the temperature rise of the rolling member and the rotary member is prevented or suppressed. As a result, a torque transmitting capacity of the continuously variable transmission may be increased, and its durability may also be improved.

Still moreover, according to the present invention, the heat radiation from at least one of the end faces of the rolling member in the axial direction to the air or to the lubricating oil is expedited by the fins, and the rolling member is cooled aggressively as a result. Accordingly, the temperature rise of the rolling member and the rotary member is prevented or suppressed. As a result, a torque transmitting capacity of the continuously variable transmission may be increased, and its durability may also be improved.

Also, according to the present invention, the flowage of the lubricating oil at the end face of the rolling member generated from its rotation is made turbulent by the micro projections. Therefore, the heat conductivity from the rolling member to the lubricating oil becomes bigger, and the rolling member is cooled aggressively by the lubricating oil. Accordingly, the temperature rise of the rolling member and the rotary member is prevented or suppressed. As a result, a torque transmitting capacity of the continuously variable transmission may be increased, and its durability may also be improved.

Furthermore, according to the present invention, the black body finishing for expediting the heat radiation is applied to the surface of the rolling member or the rotary member, so that the heat radiation is generated aggressively from the surface of the rolling member or the rotary member. Therefore, the cooling of the rolling member or the rotary member is expedited and the temperature rise of those is prevented or suppressed. Also, a torque transmitting capacity of the continuously variable transmission may be increased, and its durability may also be improved.

On the other hand, according to the present invention, the rotary member contacts with the ambient air or the lubricating oil with generating a flowage relatively by means of its rotation. In this case, the heat transfer from the rotary member to the ambient air or the lubricating oil is expedited by the fins, and as a result, the rotary member is thereby cooled aggressively. Accordingly, the temperature rise of the rolling member and the rotary member is prevented or suppressed, so that a torque transmitting capacity of the continuously variable transmission may be increased, and its durability may also be improved.

And according to the present invention, the lubricating oil is fed to the opposite side of the rolling face of the rotary member, i.e., back face of the rotary member, and is flown to the outer circumferential side by means of the centrifugal force. In this case, the lubricating oil is made turbulent by the micro projections formed on back face of the rotary member, therefore, the heat conductivity between the rotary member and the lubricating oil becomes bigger and the rotary member is cooled aggressively by the lubricating oil. Accordingly, the temperature rise of the rolling member and the rotary member is prevented or suppressed. As a result, a torque transmitting capacity of the continuously variable transmission may be increased, and its durability may also be improved.

INDUSTRIAL APPLICABILITY

This invention can be utilized in the field for manufacturing the continuously variable transmission and in the field for using the continuously variable transmission. Especially, this invention can be utilized in the field relating to an automobile having the continuously variable transmission mounted thereon.

The invention claimed is:

1. A toroidal continuously variable transmission, comprising:

a rolling member rotatable about an axial direction, including
an outer circumferential face, and
a pair of end faces at opposite ends of the rolling member in the axial direction;
a pair of rotary members having rolling faces opposed to each other, the rotary members sandwiching the rolling member therebetween, the rolling faces being separated from the outer circumferential face of the rolling member by an oil film; and
a holding member that holds the rolling member in a rotatable condition and including
a lubricating oil feeding hole for directly spraying lubricating oil to a plurality of portions at both of the end faces of the rolling member in the axial direction, which is arranged on the holding member, wherein the holding member covers both of the end faces of the rolling member in the axial direction.

2. The toroidal continuously variable transmission according to claim 1, wherein a black body finish for expediting heat radiation is applied to a surface of the rotary member or the rolling member.

3. A toroidal continuously variable transmission, comprising:
a rolling member rotatable about an axial direction, including
an outer circumferential face, and
a pair of end faces at opposite ends of the rolling member in the axial direction;
a pair of rotary members having rolling faces opposed to each other, the rotary members sandwiching the rolling member therebetween, wherein the rolling faces are separated from the outer circumferential face of the rolling member by an oil film;
a holding member that holds the rolling member in a rotatable condition about the axial direction, and in which lubricating oil is fed to the rolling member at both of the end faces, the holding member including
a circular plate for covering most part of each end face of the rolling member in the axial direction with being opposed to the one end face, wherein the holding member covers both of the end faces of the rolling member in the axial direction.

4. The toroidal continuously variable transmission according to claim 3, further comprising:
a seal member for forming an oil reservoir between the circular plate and the one end face of the rolling member in the axial direction, which is provided on the outer circumferential portion of the circular plate.

5. The toroidal continuously variable transmission according to claim 4, wherein a black body finish for expediting heat radiation is applied to a surface of the rotary member or the rolling member.

6. The toroidal continuously variable transmission according to claim 3, wherein a black body finish for expediting heat radiation is applied to a surface of the rotary member or the rolling member.

7. A toroidal continuously variable transmission, comprising:
a rolling member rotatable about an axial direction, including
an outer circumferential face, and
a pair of end faces at opposite ends of the rolling member in the axial direction;
a pair of rotary members having rolling faces opposed to each other, the rotary members sandwiching the rolling member therebetween, wherein the rolling faces are separated from the outer circumferential face of the rolling member by an oil film; and
a holding member that holds the rolling member in a rotatable condition about the axial direction and covers both of the end faces of the rolling member in the axial direction,
wherein a cross section of each end face of the rolling member includes a waveform pattern of microprojections extending circumferentially along both the end faces to cause turbulent flow of the lubricating oil; and
wherein a cross section of the microprojections is a triangle shape formed by a vertical face facing a center of the rolling member and an inclined face leading from the vertical face to the outer circumferential side.

8. The toroidal continuously variable transmission according to claim 7, wherein the waveform pattern of microprojections exhibit a sawtooth pattern, each sawtooth extending circumferentially.

9. The toroidal continuously variable transmission according to claim 7, wherein a black body finish for expediting a heat radiation is applied to a surface of the rotary member or the rolling member.

10. The toroidal continuously variable transmission according to claim 7, wherein a ratio between a pitch and a height of the microprojections is 7 to 10.

11. A toroidal continuously variable transmission, comprising:
a rolling member rotatable about an axial direction, including
an outer circumferential face,
a pair of end faces at opposite ends of the rolling member in the axial direction, each end face having a cross section with a waveform pattern of microprojections disposed to extend circumferentially along both the end faces to cause turbulent flow of the lubricating oil;
a pair of rotary members having rolling faces opposed to each other, the rotary members sandwiching the rolling member therebetween, wherein the rolling faces are separated from the outer circumferential face of the rolling member by an oil film; and
a holding member that holds the rolling member in a rotatable condition about the axial direction and including an oil passage for feeding the lubricating oil to the opposite face of the rolling faces of the rotary member.

* * * * *